(12) United States Patent
Izadpanah et al.

(10) Patent No.: US 8,559,823 B2
(45) Date of Patent: Oct. 15, 2013

(54) MULTI-APERTURE THREE-DIMENSIONAL BEAMFORMING

(75) Inventors: Hossein Izadpanah, Thousand Oaks, CA (US); Mehran Mohktari, Thousand Oaks, CA (US)

(73) Assignee: Tialinx, Inc., Irvine, CA (US)

( * ) Notice: Subject to any disclaimer, the term of this patent is extended or adjusted under 35 U.S.C. 154(b) by 1224 days.

(21) Appl. No.: 12/135,138

(22) Filed: Jun. 6, 2008

(65) Prior Publication Data

US 2009/0092158 A1    Apr. 9, 2009

Related U.S. Application Data

(60) Provisional application No. 60/933,435, filed on Jun. 6, 2007.

(51) Int. Cl.
*H04B 10/00* (2013.01)

(52) U.S. Cl.
USPC .......................................................... 398/115

(58) Field of Classification Search
None
See application file for complete search history.

(56) References Cited

U.S. PATENT DOCUMENTS

| | | | | |
|---|---|---|---|---|
| 3,354,461 A | * | 11/1967 | Kelleher | 342/374 |
| 3,909,829 A | * | 9/1975 | Daly | 342/368 |
| 4,736,463 A | * | 4/1988 | Chavez | 359/107 |
| 5,079,557 A | * | 1/1992 | Hopwood et al. | 342/373 |
| 5,374,935 A | * | 12/1994 | Forrest | 342/368 |
| 6,100,843 A | * | 8/2000 | Proctor et al. | 342/368 |
| 7,504,985 B2 | * | 3/2009 | Henson et al. | 342/25 R |
| 2003/0202794 A1 | * | 10/2003 | Izadpanah et al. | 398/115 |

* cited by examiner

*Primary Examiner* — Kenneth N Vanderpuye
*Assistant Examiner* — Darren E Wolf
(74) *Attorney, Agent, or Firm* — Haynes and Boone, LLP (57) ABSTRACT

In one embodiment, a system is provided that includes: a mode-locked laser source configured to provide a pulsed multi-frequency laser output signal having spectrum with a plurality of comb lines, wherein one of the comb lines is a reference comb line, the comb lines forming a plurality of comb line pairs comprising the reference comb line and selected ones of the remaining comb lines; a plurality of optical-electronic (OE) conversion circuits, each OE circuit corresponding on a one-to-one basis to the plurality of comb line pairs, wherein each OE circuit is configured to provide an electrical output signal having a frequency corresponding to a heterodyning of the comb lines in its corresponding comb line pair; a plurality of amplifiers corresponding on a one-to-one basis with the OE conversion circuits, each amplifier configured to amplify a version of the electrical output signal from its corresponding OE conversion circuit so as to provide an amplified output signal; and an array of antennas corresponding on a one-to-one basis to the plurality of amplifiers, each antenna configured to transmit the amplified output signal from the corresponding amplifier, whereby the array of antennas transmits a coherent and multi-frequency signal output pulse.

6 Claims, 7 Drawing Sheets

MULTI-APERTURE THREE-DIMENSIONAL BEAMFORMING

RELATED APPLICATION

This application claims the benefit of U.S. Provisional Application No. 60/933,435 filed Jun. 6, 2007, the contents of which are hereby incorporated by reference.

TECHNICAL FIELD

The disclosure relates generally to beamforming and more particularly to a multi-aperture system for three-dimensional (3D) beamforming.

BACKGROUND

Beamforming antenna array technology is commonly employed to confine and focus radiated energy within a desired region of operating space. The radiated energy may also be concentrated in the time domain using short impulses such as in an Ultra-Wide Band (UWB) system, as opposed to a continuous wave source, to further increase the peak radiated energy within a desired region. In this fashion, one can illuminate a narrower part of a target, thereby increasing spatial resolution, received signal power, and detection sensitivity. However, there are natural obstacles that limit the amount of energy that can be directed onto a desired region. For example, the impulse peak intensity radiation is formed in the transmitter before and after a pulse exits an antenna. Therefore, the intense pulse, along and across the main radar beam, propagates uniformly, in time and space, away from the antenna before reaching the target. Such propagation of the pulse lowers the peak intensity at a desired target.

Accordingly, there is a need in the art for improved beamforming systems that provide greater radiated peak intensity.

SUMMARY

In accordance with an embodiment, a system is provided that includes: a mode-locked laser source configured to provide a pulsed multi-frequency laser output signal having spectrum with a plurality of comb lines, wherein one of the comb lines is a reference comb line, the comb lines forming a plurality of comb line pairs comprising the reference comb line and selected ones of the remaining comb lines; a plurality of optical-electronic (OE) conversion circuits, each OE circuit corresponding on a one-to-one basis to the plurality of comb line pairs, wherein each OE circuit is configured to provide an electrical output signal having a frequency corresponding to a heterodyning of the comb lines in its corresponding comb line pair; a plurality of amplifiers corresponding on a one-to-one basis with the OE conversion circuits, each amplifier configured to amplify a version of the electrical output signal from its corresponding OE conversion circuit so as to provide an amplified output signal; and an array of antennas corresponding on a one-to-one basis to the plurality of amplifiers, each antenna configured to transmit the amplified output signal from the corresponding amplifier, whereby the array of antennas transmits a coherent and multi-frequency signal output pulse.

In accordance with another embodiment, a method is provided for producing a coherent and multi-frequency output signal pulse. The method includes: generating a coherent optical comb signal, the optical comb signal including a reference comb line and a plurality of remaining comb lines, the reference comb line corresponding to the plurality of remaining comb lines so as to form unique comb line pairs, the coherent optical comb signal being pulsed at a pulse repetition frequency (PRF); heterodyning the comb line pairs to produce electrical comb lines signals separated in frequency by the PRF; and transmitting versions of the electrical comb lines signals through antennas to form the coherent and multi-frequency output signal pulse.

The invention will be more fully understood upon consideration of the following detailed description, taken together with the accompanying drawings.

BRIEF DESCRIPTION OF THE DRAWINGS

FIG. 5b is a close-up of the waveform of FIG. 5a;

FIG. 5c illustrates a resulting amplitude waveform from the coherent multi-frequency signals of FIG. 5a;

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

A system is disclosed that directs radiated energy to a desired three-dimensional region. Although conventional beamforming also concentrates radiated energy, the peak intensity of the radiated energy declines with range as the pulse is transmitted away from such systems. As will be further explained herein, a system is disclosed that radically departs from such conventional beamforming in that the energy is concentrated within a single specified point in space (the "target") and not in any other regions along the beam propagation path before reaching or after passing the target. The single specified point in space may thus be denoted as a "hot spot." Unlike a conventional UWB system, the technique excludes the formation of the intense "Hot Spot" in any other spatial location along the radar range and beam coverage.

Figure 1:
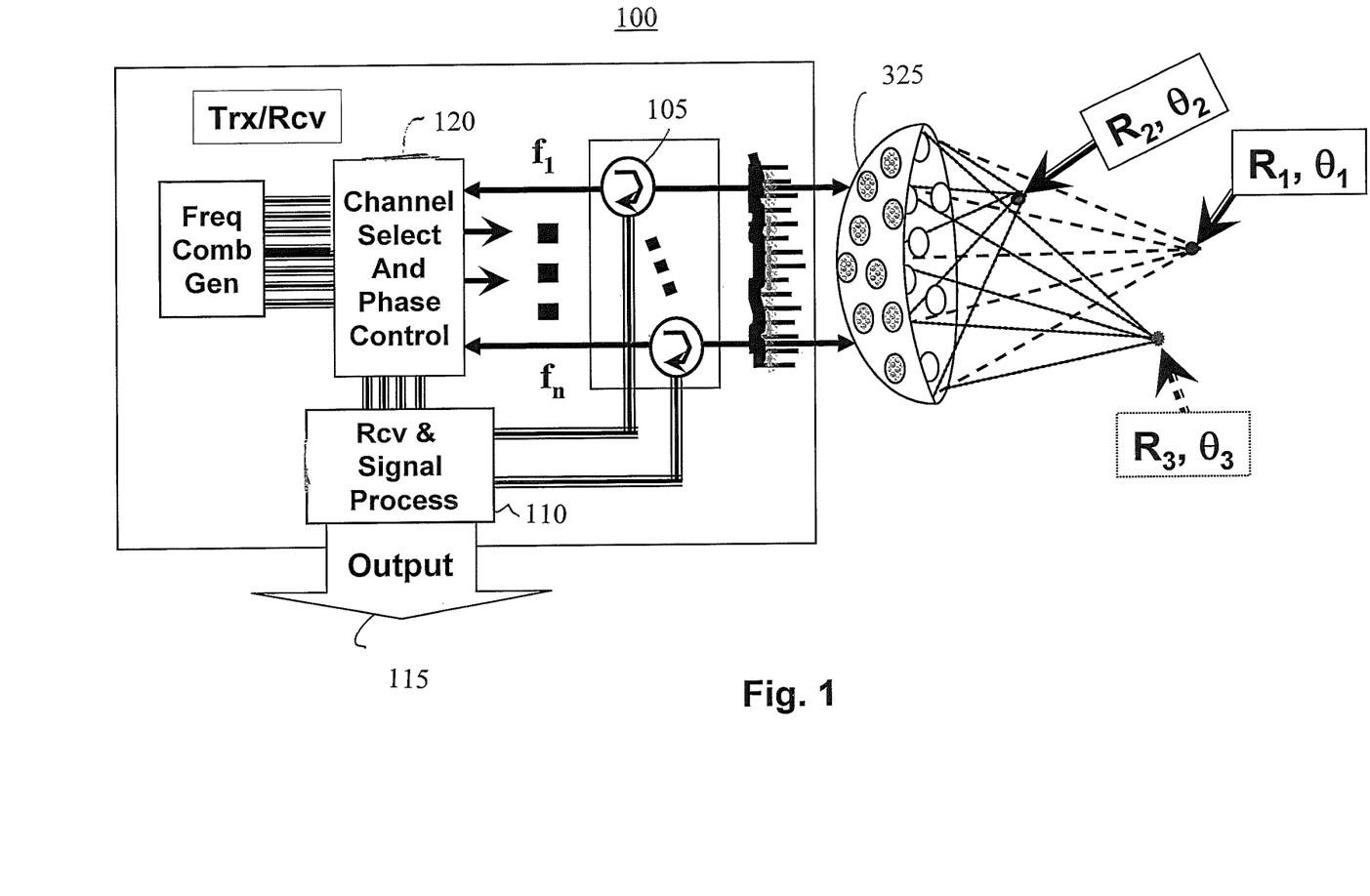
FIG. 1 is a block diagram of a transmitting/receiving system.
Figure 2:
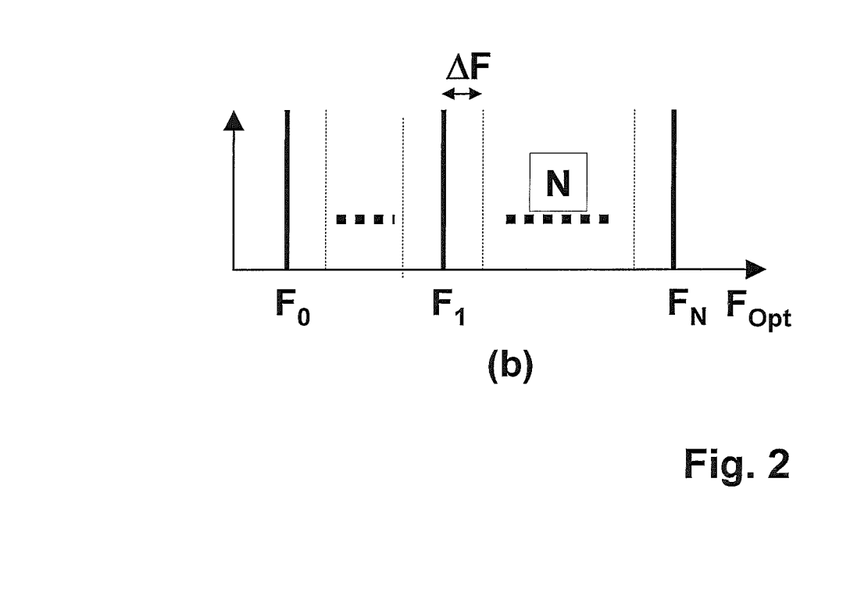
FIG. 2 illustrates an optical comb line frequency spectrum.
Figure 3:
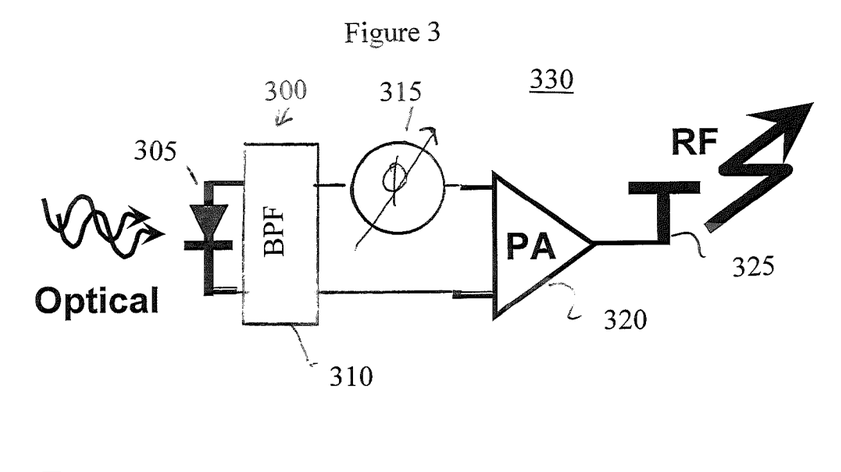
FIG. 3 illustrates a channel for the system of FIG. 1.

The following discussion will be with regard to a microwave or millimeter-wave radar system. However, it will be appreciated that the hot spot formation concept has broad applicability in any frequency domain: for example, ultrasound, X-ray, and optical systems could all be constructed according to the concepts disclosed herein. The disclosed hot spot radar system uses optical-electronic (OE) signal generation to generate a plurality of RF output tones/output signals across a range of frequencies. Turning now to FIG. 1, an transmitter/receiver system 100 includes a coherent multi-frequency optical source such as a mode-locked laser (MLL) 100 that pulses at a certain pulse repetition frequency (PRF). Alternative optical sources include a phased-locked multi-frequency photonic oscillator. An example MLL 100 may have a PRF of 2.5 GHz. As known in the optical arts, the resulting optical spectrum is known as an optical frequency comb in that it resembles a pocket comb as shown in FIG. 2. The optical frequency comb starts at a frequency F0 and ranges to a frequency FN, where FN is an integer N multiple of the PRF. When the optical comb lines are sensed by an optical-electronic conversion circuit and converted into electrical signals, the lines heterodyne or beat, with each other to produce a lower IF frequency that is realizable in the electrical domain. As seen in FIG. 3, an optical-electronic (OE) conversion circuit 300 may be formed using a photodiode 305 coupled to a bandpass filter 310 such that particular optical comb lines are selected for heterodyning. Depending upon the center frequency of the filter and the characteristics of the photodiode, a first OE conversion circuit may respond to a reference one (for example, the lowest frequency) of the comb lines and an adjacent comb line so as to provide an electrical signal having a frequency equal to the PRF as known in the arts. A second OE conversion circuit may respond to the reference comb line and a next-to-adjacent comb line so as to provide an electrical signal having a frequency of twice the PRF, and so on such that multiple electrical signals are produced ranging from PRF to N*PRF. It will be appreciated that the OE conversion circuits may be configured such that the starting frequency is not the PRF but instead is a multiple of the PRF. As will be explained further herein, the resulting electronic signal from the OE conversion circuit may be phase-shifted in a variable phase-shifter 315 and amplified in a narrowband tuned amplifier 320 before transmission as an RF signal from an antenna 325. The resulting combination of elements shown in FIG. 3 may be referred to as a channel 330.

Referring back to FIG. 1, it may thus be seen that a particular channel 330 selects for a particular pair of optical comb lines, provides phase control if desired, and transmits the resulting signal through a corresponding antenna (or antennas) 325. Each channel may include a circulator 105 so that a received signal (resulting from a reflection produced by the ensuing RF pulse) may be processed by a receiver 110 to provide output data 115. Receiver 110 may comprise a homodyne receiver. Because each OE conversion circuit is configured to beat a unique pair of comb lines, each OE conversion circuit may be considered to select the comb lines for its channel. The resulting collection of OE conversion circuits, phase-shifters, and amplifiers for the various channels is thus designated in FIG. 1 as a channel select and phase control module 120. The resulting RF spectrum forms a comb spectrum in the RF domain. Each channel corresponds to a unique comb frequency in this RF comb. In FIG. 1, the channel frequencies range from a lowest frequency $f_1$ to a highest frequency $f_n$. Just like the optical comb lines, adjacent RF comb frequencies are separated by the PRF. Thus, a first channel corresponds to $f_1$, a second channel corresponds to an adjacent higher frequency $f_2$ and so on such that a final channel corresponds to the highest comb frequency $f_n$.

Figure 4:
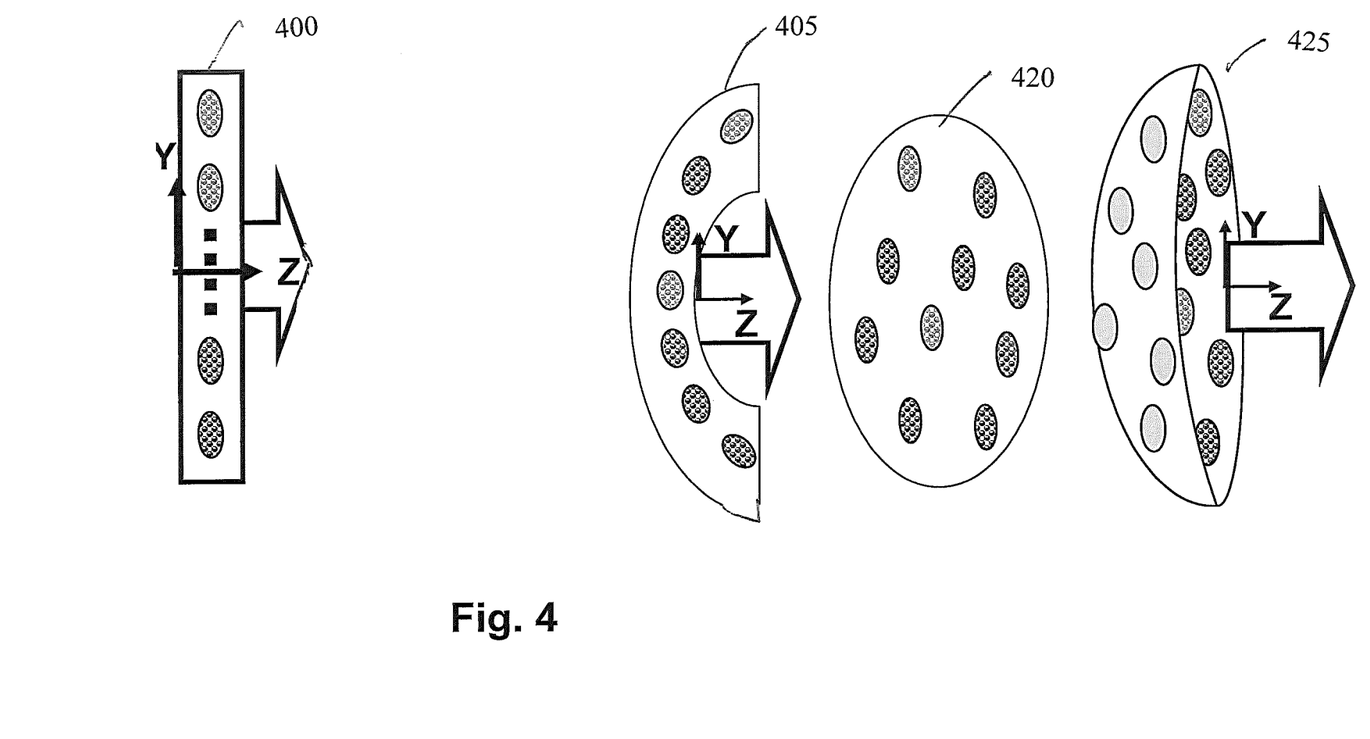
FIG. 4 illustrates example antenna arrays for the system of FIG. 1.
Figure 5A:
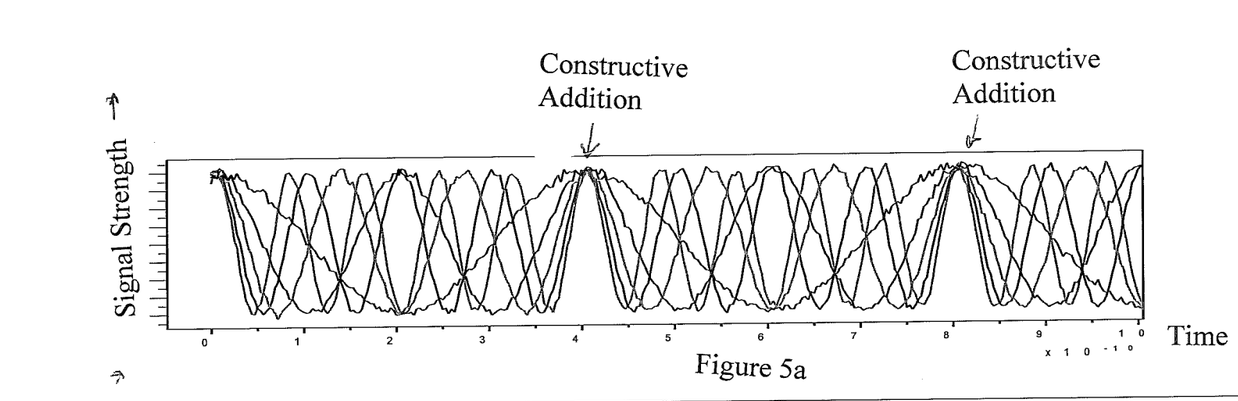
FIG. 5a illustrates the coherent multi-frequency signals within an output pulse waveform from the system of FIG. 1.
Figure 5B:
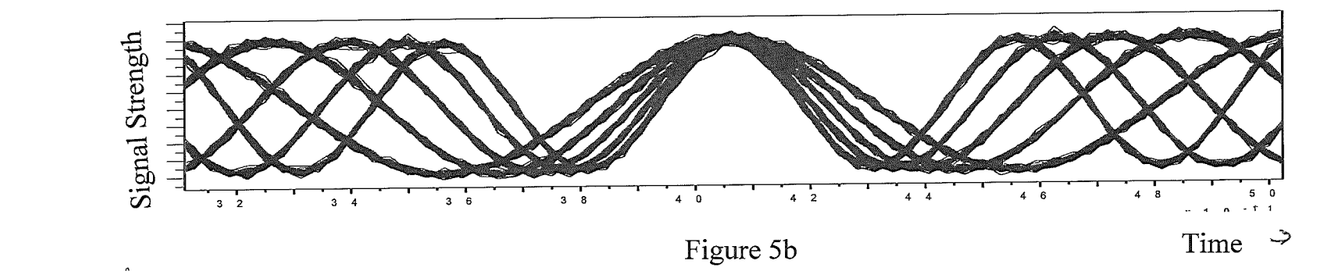
Figure 5C:
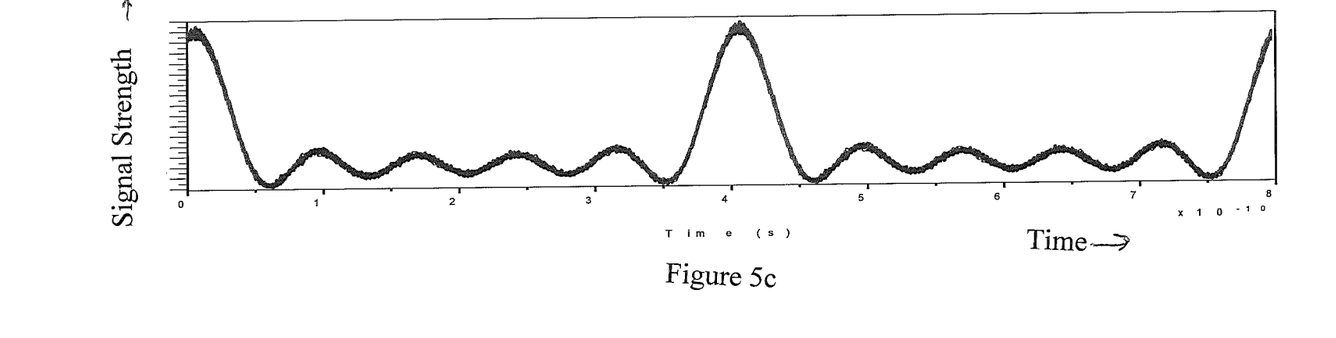

Turning now to FIG. 4, the resulting array of antennas may be arranged in many different arrays. For example, they may be arranged in a linear fashion as in array 400, a circular array 405, across a wafer surface 420, or across a three-dimensional hemisphere 425. Now consider the RF pulse produced by array 400. If each channel is not phase-shifted, the various RF signals corresponding to the channels will radiate away from the array as shown in FIG. 5a. Because the pulsed RF comb signals are coherent, they will constructively add at certain points across their waveforms. FIG. 5b illustrates an expanded view of the constructive addition. Outside of these points, the waveforms are out-of-phase and will tend to destructively interfere with each other. A resulting amplitude spectrum from the constructive and destructive effects is shown in FIG. 5c. Note the resulting constructive addition will not form a hot "spot" but instead will form a hot pulse of energy radiating away from the antenna array at the speed of light.

Figure 6:
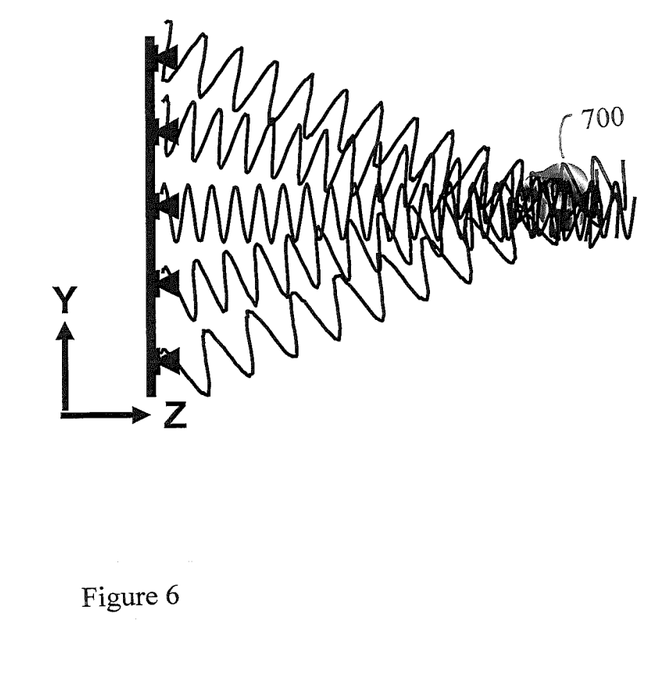
FIG. 6 illustrates the coherent addition of the multi-frequency signals of FIG. 5a at a particular spot in space.

But each channel may be phased with respect to the remaining channels using phase-shifters 315. The resulting beamforming effect causes the hot spot to focus at a particular range as shown in FIG. 6. If the phasing is appropriate, only at the angle and range of a hot spot 700 do the waveforms constructively add as discussed with regard to FIGS. 3a-c. Referring back to FIG. 1, it is shown that system 100 may produce a hot spot at various ranges, elevation, and azimuth angles. It will be appreciated that greater directivity may be provided if the antennas are gimbaled or actuated such that they may be physically directed in different directions. A user could then numerically simulate what phase (and actuation if that feature is provided) will produce a hot spot at a desired x, y, z location with respect to system 100. Module 120 may include a controller for controlling the phasing of the channels and/or actuation of the antennas so as to control the hot spot location.

In general, the frequencies of the RF comb lines will depend upon the characteristics of the optical source and the selection by the OE conversion circuits. For example, suppose one desires N=8 comb lines starting from a lowest frequency ($F_L$) of 10 GHz. If the optical source PRF is 2.5 GHz, then the highest frequency ($F_H$) of the resulting RF comb will be $F_H=F_L+N\times PRF$, which in this example will be equal to 30 GHz.

Figure 7:
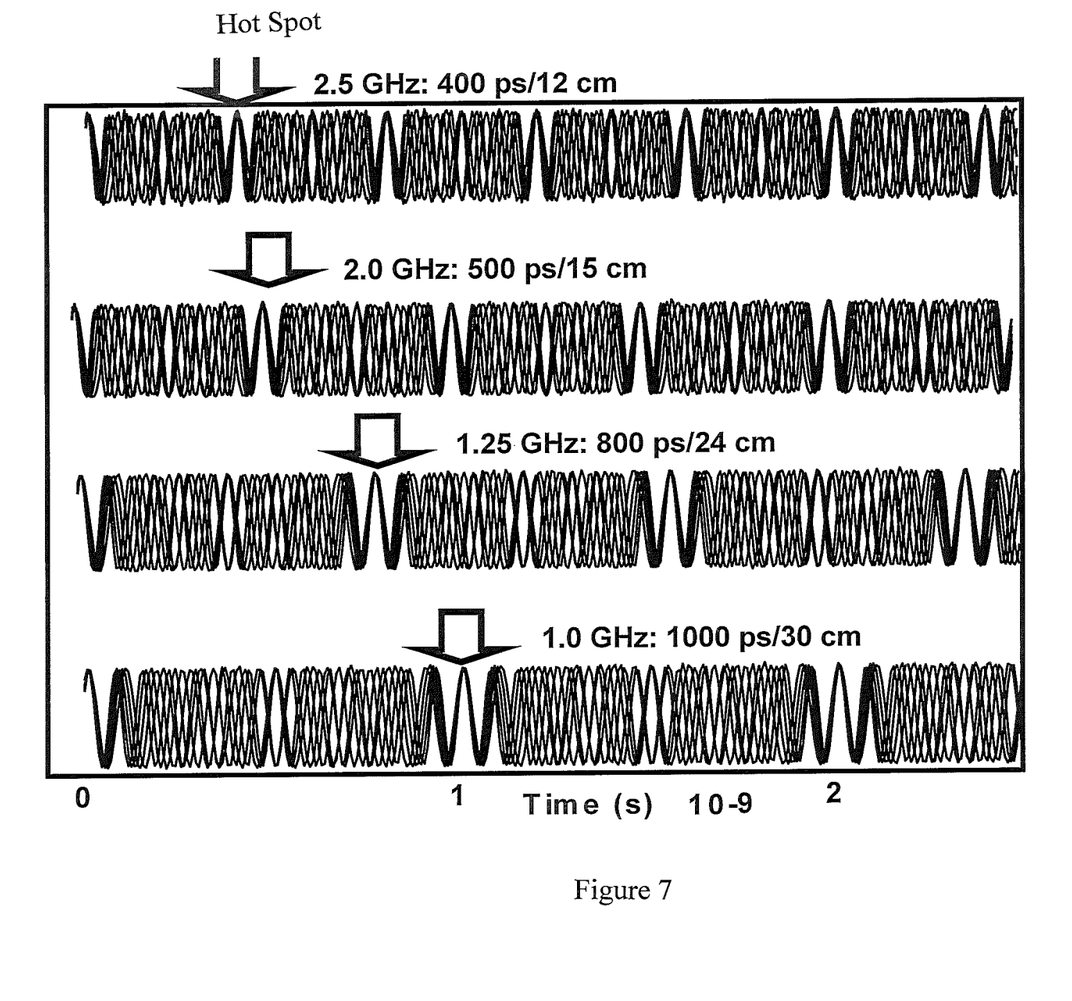
FIG. 7 illustrates a range control for the coherent addition of FIG. 6 by varying a modulation frequency for the coherent optical source of FIG. 1.

The hot spot size is directly proportional to the system pulse width, which itself is a function of comb average frequency in the operating band $[F_{av}=(F_H-F_L)/2]$ and the number N of selected comb frequency lines. Simulation results show that a higher $F_{av}$ and/or N values will generate shorter pulse widths leading to a decrease in the hot spot size. The hot spot range depends upon the system PRF wavelength λ, which equals the ratio c/PRF, where c is the speed of light. In addition, the hot spot location may be controlled through a variation of an active MLL modulation (drive) frequency for the MLL optical source. This control may be performed in continuous or discrete and incremental steps. The change will cause to shift the hot spot to a new position corresponding to the ratio c/$PRF_{new}$, where c is the speed of light and $PRF_{new}$ is the pulse repetition frequency resulting from the modulation of the MLL source. Simulation examples of such control are shown in FIG. 7 for four different values of PRFs (2.5 GHz, 2.0 GHz, 1.25 GHz, and 1.0 GHz) for an RF comb spectrum with N=8 and $F_L$=10 GHz. In this fashion, the hot spot varied in range from 12 centimeters to 30 centimeters.

Figure 8:
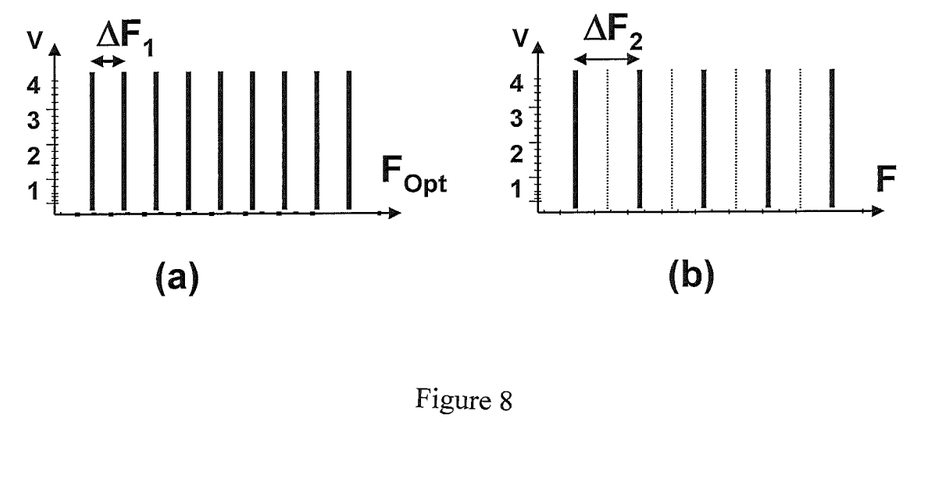
FIG. 8 illustrates alternative selection of comb line pairs with respect to a reference comb line.

Based on the same concept, a fine tuning in range of the hot spot can also be achieved by varying, either discretely or continuously, the reference comb line phase. Alternatively, a discrete change in the hot spot range is also possible by tuning each bandpass filter (or selecting for an alternative bandpass filter) such that the comb line selection is changed. For example, as seen in FIG. 8, a first bandpass filter tuning or selection selects for an immediately adjacent comb line in spectrum a (with respect to some reference) whereas a second tuning (or bandpass filter selection) selects for every other adjacent comb line as shown for spectrum b. As yet another example of range control, the reference comb line frequency may be stepped or varied. By varying the phase of the reference comb between 0 degrees and 180 degrees, the PRF is varied by one half wavelength, which also changes the range of the resulting hot spot.

Although described with respect to an RF embodiment, those of ordinary skill in the optical arts will appreciate that an optical comb could be converted to an electrical comb at ultrasonic frequencies such that a focused hot spot of ultrasonic energy could be produced at a desired location. Alternatively, the optical comb could be converted to X-ray frequencies for directing x-rays in the same fashion. Thus, although the disclosure herein have been directed to various embodiments, this description is only an example of certain applications and should not be taken as a limitation. Consequently, the scope of the claimed subject matter is set forth as follows.

We claim:

1. A system, comprising:
    a mode-locked laser source configured to provide a pulsed multi-frequency laser output signal having a spectrum with a plurality of comb lines, wherein one of the comb lines is a reference comb line, the comb lines forming a plurality of comb line pairs comprising the reference comb line and selected ones of the remaining comb lines;
    a plurality of N optical-electronic (OE) conversion circuits, each OE circuit corresponding on a one-to-one basis to the plurality of comb line pairs, wherein each OE circuit is configured to provide an electrical output signal having a frequency corresponding to a heterodyning of the comb lines in its corresponding comb line pair, and wherein the frequency for a first one of OE conversion circuits equals a pulse repetition frequency multiple (PRF) for the comb lines; a frequency for a second one of the OE conversion circuits equals 2*PRF, and so on such that a final Nth one of the OE conversion circuits has a frequency of N*PRF;
    a plurality of amplifiers corresponding on a one-to-one basis with the OE conversion circuits, each amplifier configured to amplify a version of the electrical output signal from its corresponding OE conversion circuit so as to provide an amplified output signal;
    an array of antennas corresponding to the plurality of amplifiers, each antenna configured to transmit the amplified output signal from the corresponding amplifier, whereby the array of antennas transmits a coherent and multi-frequency signal output pulse;
    a plurality of variable phase-shifters corresponding on a one-to-one basis with the OE conversion circuits, each variable phase-shifter configured to phase-shift the version of the electrical output signal provided to the amplifier corresponding to the phase-shifter's OE conversion circuit; and
    a controller configured to control the variable phase-shifters such that the multi-frequencies in the output pulse constructively add with each other at a desired range, azimuth, and elevation angle with respect to the array.

2. The system of claim 1, wherein each antenna comprises a sub-array of antennas.

3. The system of claim 1, wherein the array of antennas is a linear array.

4. The system of claim 1, wherein the array of antennas is a circular array.

5. The system of claim 1, wherein the array of antennas is a hemispherical array.

6. A method of producing a coherent and multi-frequency output signal pulse, comprising:
    generating a coherent optical comb signal, the optical comb signal including a reference comb line and a plurality of remaining comb lines, the reference comb line corresponding to the plurality of remaining comb lines so as to form unique comb line pairs, the coherent optical comb signal being pulsed at a pulse repetition frequency multiple (PRF);
    heterodyning the comb line pairs to produce N electrical comb lines signals separated in frequency by the PRF such that the electrical comb lines range in frequency from PRF to N*PRF;
    transmitting versions of the electrical comb lines signals through antennas to form the coherent and multi-frequency output signal pulse; and
    controlling a phase of each of the electrical comb line signals relative to each other so that the multi-frequency output signals constructively add together at a desired range, elevation angle, and azimuth angle with respect to the array.

* * * * *